US012509231B2

(12) United States Patent
Wieland et al.

(10) Patent No.: US 12,509,231 B2
(45) Date of Patent: Dec. 30, 2025

(54) AIRCRAFT SEAT CONNECTOR FOR MOUNTING AN AIRCRAFT SEAT TO AN AIRCRAFT

(71) Applicant: B/E Aerospace Fischer GmbH, Landshut (DE)

(72) Inventors: Melanie Wieland, Landshut (DE); Sinan Akdeniz, Landshut (DE); Herbert Hacker, Landshut (DE)

(73) Assignee: B/E Aerospace Fischer GmbH, Landshut (DE)

( * ) Notice: Subject to any disclaimer, the term of this patent is extended or adjusted under 35 U.S.C. 154(b) by 0 days.

(21) Appl. No.: 18/799,067

(22) Filed: Aug. 9, 2024

(65) Prior Publication Data
US 2025/0051015 A1 Feb. 13, 2025

(30) Foreign Application Priority Data
Aug. 11, 2023 (EP) .................................. 23191092

(51) Int. Cl.
*B64D 11/06* (2006.01)
*B64C 1/18* (2006.01)
*B64C 27/04* (2006.01)

(52) U.S. Cl.
CPC ............ *B64D 11/0648* (2014.12); *B64C 1/18* (2013.01); *B64C 27/04* (2013.01)

(58) Field of Classification Search
CPC ............................ B64D 11/0696; B60N 2/015
See application file for complete search history.

(56) References Cited

U.S. PATENT DOCUMENTS

| 5,178,346 | A | 1/1993 | Beroth |
| 7,029,215 | B2 | 4/2006 | Dowty |
| 7,334,758 | B2 | 2/2008 | Williamson et al. |
| 8,528,860 | B2 | 9/2013 | VanderWolk |
| 11,542,014 | B2 | 1/2023 | Oleson |
| 2011/0062286 | A1* | 3/2011 | Pinkal ................ B64D 11/0696 244/131 |
| 2016/0075434 | A1 | 3/2016 | Siegmeth |
| 2017/0233079 | A1 | 8/2017 | Kovago |
| 2020/0122840 | A1* | 4/2020 | Seibt ......................... B64C 1/20 |

FOREIGN PATENT DOCUMENTS

| DE | 102007016530 A1 | 10/2008 |
| WO | 2022075968 A1 | 4/2022 |

OTHER PUBLICATIONS

European Patent Office, Extended European Search Report received in EP Application No. 23191092.8, 8 pages.

* cited by examiner

Primary Examiner — Nicholas McFall
Assistant Examiner — Eric Acosta
(74) Attorney, Agent, or Firm — Suiter Swantz IP

(57) ABSTRACT

An aircraft seat connector for mounting an aircraft seat to a mounting rail provided at a floor of an aircraft cabin is provided. The aircraft seat connector comprises a base portion for being introduced into the mounting rail and a seat connection portion. The seat connection portion extends from the base portion and is configured for being releasably coupled to an aircraft seat. The seat connection portion allows for coupling the aircraft seat to the seat connection portion in at least two different spatial orientations.

17 Claims, 5 Drawing Sheets

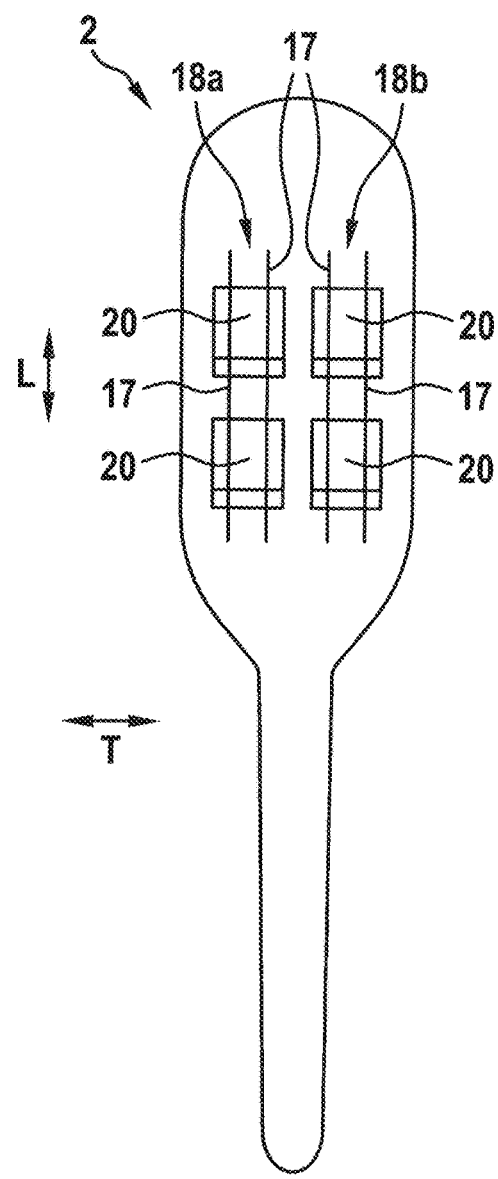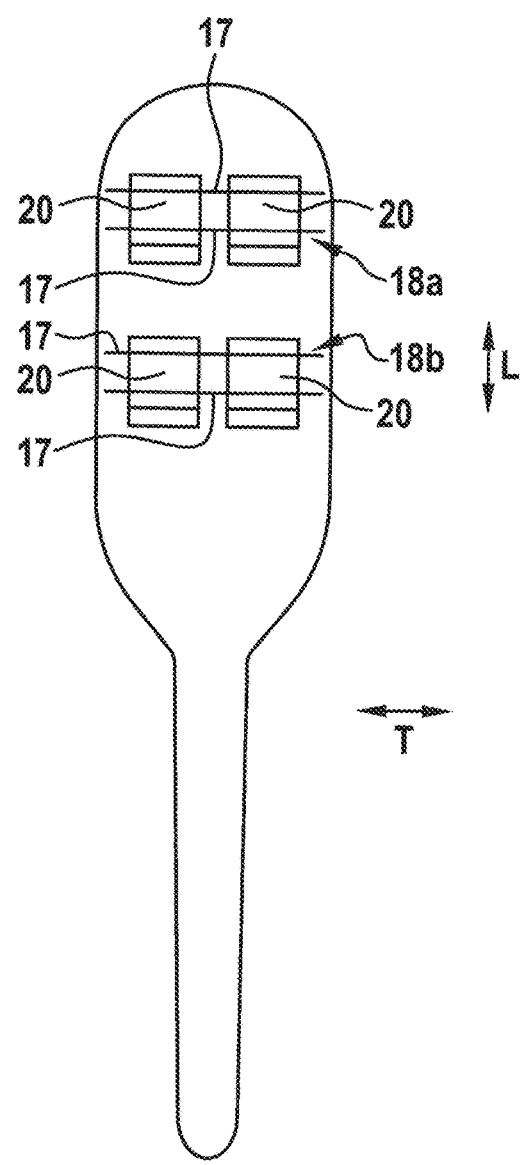

AIRCRAFT SEAT CONNECTOR FOR MOUNTING AN AIRCRAFT SEAT TO AN AIRCRAFT

TECHNICAL FIELD

The present invention is in the field of aircraft seats. In particular, the present invention relates to an aircraft seat connector for mounting an aircraft seat to a mounting rail provided in an aircraft. The present invention further relates to an aircraft seat, to an aircraft comprising an aircraft seat, and to a method of mounting an aircraft seat to an aircraft.

CROSS-REFERENCE TO RELATED APPLICATIONS

The instant application claims priority under 35 U.S.C § 119 to European patent application 23191092.8 entitled AIRCRAFT SEAT CONNECTOR, AIRCRAFT SEAT, AIRCRAFT, AND METHOD OF MOUNTING AN AIRCRAFT SEAT TO AN AIRCRAFT, filed Aug. 11, 2023. Said patent application 23191092.8 is herein incorporated by reference in its entirety.

BACKGROUND

Aircraft, such as airplanes and helicopters, are equipped with aircraft seats for pilot(s) and passengers. Aircraft seat connectors may be used for mounting the aircraft seats to mounting rails that extend through the aircraft. Depending on the configuration of the aircraft and the aircraft seats, there may be a desire to mount the aircraft seats to the mounting rails in different ways.

It would therefore be beneficial to provide aircraft seat connectors which allow for mounting aircraft seats to mounting rails, provided in an aircraft, with a high degree of flexibility.

SUMMARY

Exemplary embodiments of the invention include an aircraft seat connector for mounting an aircraft seat to a mounting rail provided at a floor of an aircraft cabin. The aircraft seat connector comprises a base portion for being introduced into the mounting rail and a seat connection portion. The base portion may extend in a longitudinal direction of the aircraft seat connector. The seat connection portion extends from the base portion and is configured for being releasably coupled to an aircraft seat. The seat connection portion allows for coupling the aircraft seat to the seat connection portion in at least two different spatial orientations.

The aircraft seat connector may also be referred to as a fitting, which is provided for coupling the aircraft seat to the mounting rail.

Exemplary embodiments of the invention also include an aircraft seat comprising a coupling portion, which is configured for coupling the aircraft seat to the seat connection portion of an aircraft seat connector according to an exemplary embodiment of the invention. The coupling portion is shaped to selectively engage with the seat connection portion of the aircraft seat connector in at least two different orientations of the aircraft seat with respect to the aircraft seat connector.

Exemplary embodiments of the invention further include a method of mounting an aircraft seat to a mounting rail provided at a floor of an aircraft cabin, wherein the method comprises: introducing a base portion of an aircraft seat connector into the mounting rail for mounting the aircraft seat connector to the mounting rail; and mounting a coupling portion of the aircraft seat to a seat connection portion of the aircraft seat connector in one of at least two different orientations that are possible between the coupling portion of the aircraft seat and the seat connection portion of the aircraft seat connector.

Mounting the coupling portion of the aircraft seat to the seat connection portion of the aircraft seat connector may in particular include passing a fixing element through one of at least two openings formed in the seat connection portion of the aircraft seat connector.

With exemplary embodiments of the invention, the same aircraft seat connector may be used for mounting an aircraft seat to the mounting rails, provided in an aircraft, in at least two different orientations. In consequence, the need for providing different aircraft seat connectors for mounting aircraft seats in different orientations to the aircraft may be eliminated. As compared to previous approaches, where different aircraft seat connectors were used for mounting the aircraft seat to the mounting rail in different orientations, the need to use a particular aircraft seat connector for a particular orientation may be eliminated. Also, the need for replacing an existing aircraft seat connector, when the orientation of an aircraft seat in the aircraft cabin is changed, may be eliminated. Overall, a high degree of flexibility in mounting aircraft seats to the mounting rails of an aircraft cabin may be achieved. Also, the number of different parts, which are in use for mounting aircraft seats to an aircraft, may be reduced. The assembly of aircraft may thus be simplified, and the costs may be reduced.

In an embodiment, the seat connection portion comprises at least two openings, wherein each of the at least two openings is configured for receiving a fixing element to extend through the opening for fixing the aircraft seat to the aircraft seat connector. The at least two openings may extend through the seat connection portion in at least two different directions. This may allow for the aircraft seat to be mounted to the aircraft seat connector in at least two different orientations by passing the fixing element selectively through one of the at least two openings.

Being configured for receiving a fixing element, each of the at least two openings may in particular be shaped and dimensioned for receiving a correspondingly shaped and dimensioned fixing element.

In an embodiment, the seat connection portion comprises exactly two openings. The exactly two openings may in particular extend substantially orthogonal to each other.

In an embodiment, the exactly two openings include a first opening, extending in the longitudinal direction of the aircraft seat connector, and a second opening, extending in a transverse direction of the aircraft seat connector. The transverse direction of the aircraft seat connector may in particular be oriented substantially orthogonal to the longitudinal direction of the aircraft seat connector.

In the context of the present document, the term substantially orthogonal is to be understood as including an exactly orthogonal orientation as well as orientations that are very close to an exactly orthogonal orientation. Substantially orthogonal orientations may in particular include all orientations that deviate by less than 5° from an exactly orthogonal orientation.

In an embodiment, the seat connection portion comprises more than two openings, in order to allow for mounting an aircraft seat in more than two different spatial orientations. The seat connection portion may in particular comprise three or four openings.

In an embodiment, the openings are provided as channels or ducts, extending through the seat connection portion of the aircraft seat connector.

In an embodiment, the seat connection portion comprises a first pair of walls, extending in the transverse direction and being arranged on opposite sides of the seat connection portion along the longitudinal direction, and a second pair of walls, extending in the longitudinal direction and being arranged on opposite sides of the seat connection portion along the transverse direction. The first opening may run through the first pair of walls, allowing for the fixing element to pass through the first pair of walls in the longitudinal direction. The second opening may run through the second pair of walls, allowing for the fixing element to pass through the second pair of walls in the transverse direction. Such a configuration may provide for a particularly mechanically stable seat connection portion. Forces between aircraft seats and the mounting rails may be transferred in a particularly effective and reliable manner.

In an embodiment, the space between the opposing sidewalls is empty. In this way, high mechanical stability may be combined with a comparably low weight of the aircraft seat connector.

In an embodiment, the at least two openings extend in a common connection plane. Said common connection plane may be oriented substantially parallel to the base portion of the aircraft seat connector.

In an embodiment, the at least two openings cross within the seat connection portion. In this way, it may be ensured that the aircraft seat is spaced equally or similarly from the base portion/from the mounting rail, irrespective of its mounting orientation. A secure stand of the aircraft seat on the floor of the aircraft cabin may be reached, irrespective of the mounting orientation of the aircraft seat.

In an embodiment, the seat connection portion includes a cubic head portion, with the at least two openings extending through the cubic head portion. A cubic head portion may provide for a seat connection portion that has particularly high mechanical stability. A cubic head portion has a rotational symmetry of 90°. This may allow for mounting an aircraft seat to the seat connection portion in two different spatial orientations, which are rotated by 90° with respect to each other, in a particularly convenient manner.

In an embodiment, the seat connection portion is integrally formed with the base portion. In this way, an integrally formed aircraft seat connector may be provided. Such an integrally formed aircraft seat connector may be formed efficiently in a single manufacturing step, such as a casting step. An integrally formed aircraft seat connector does not comprise a mechanical interface between the seat connection portion and the base portion and may thus result in a particularly high mechanical stability of the aircraft seat connector.

In an embodiment, the seat connection portion extends from the base portion in a height direction, which is oriented orthogonal to a plane spanned by the longitudinal direction and by the lateral direction. Such a configuration may provide for a very convenient setup that allows for introducing the base portion of the aircraft seat connector into a channel, formed in a mounting rail, and mounting an aircraft seat to the seat connection portion, protruding out of said channel.

In an embodiment, the base portion has a longitudinal extension in the range of between 20 mm and 390 mm in the longitudinal direction of the aircraft seat connector.

In an embodiment, the base portion has a transverse extension in the range of between 20 mm and 130 mm in the transverse direction of the aircraft seat connector.

In an embodiment, the seat connection portion has a longitudinal extension in the range of between 5 mm and 130 mm in the longitudinal direction of the aircraft seat connector.

In an embodiment, the seat connection portion has a transverse extension in the range of between 5 mm and 130 mm in the transverse direction of the aircraft seat connector.

In an embodiment, the seat connection portion has a height in the range of between 5 mm and 130 mm in a vertical direction, which is oriented orthogonal to the longitudinal direction of the aircraft seat connector and to the transverse direction of the aircraft seat connector.

Such dimensions have been found as well suited for conveniently mounting an aircraft passenger seat to a mounting rail, provided in an aircraft.

In an embodiment, the base portion comprises at least one pair of wing-shaped protrusions. The wing-shaped protrusions may protrude laterally, i.e. in a direction transverse to the longitudinal direction of the aircraft seat connector, form the base portion. The wing-shaped protrusions may be configured for sliding into corresponding undercuts, formed in the mounting rail, for engaging the base portion with the mounting rail.

The wing-shaped protrusions may in particular protrude orthogonal to the longitudinal direction of the aircraft seat connector from the base portion.

In an embodiment, the aircraft seat connector further comprises a fixing mechanism for fixing the base portion to the mounting rail. The fixing mechanism may in particular by a spring driven fast fixing mechanism. Such a fixing mechanism may allow for securely fixing the base portion to a mounting rail. It may further allow for releasing the base portion from the mounting rail in a fast and convenient manner by releasing the fixing mechanism. such form of fixation may allow for changing the seat configuration in the aircraft cabin and/or replacing at least some of the aircraft seats in a particularly fast and convenient manner.

In an embodiment, the aircraft seat connector is a helicopter seat connector for mounting a helicopter seat to a mounting rail provided at a floor of a helicopter cabin. The enhanced mounting flexibility, as provided by the aircraft seat connector described herein, may be particularly useful in a helicopter environment. In helicopter cabins, it is often desired to combine helicopter seats that face forward or backward with helicopter seats that face starboard or port side. Also, in helicopter cabins, it is often desired to have full manufacturing flexibility with respect to the orientation of the helicopter seats, in particular with respect to the passenger seats of the helicopter.

In an embodiment, the aircraft seat connector is an airplane seat connector for mounting an airplane seat to a mounting rail provided at a floor of a cabin of an airplane.

An aircraft seat according to an exemplary embodiment of the invention may comprise support legs for supporting the aircraft seat on a support, in particular on the mounting rails/on the floor of the aircraft cabin, and the coupling portion may be formed as part of said support legs.

The aircraft seat may additionally comprise a support structure, for example a support frame, which is coupled to or integrally formed with the support legs, a seat pan, a seat back, a headrest, armrests and/or other components of an aircraft seat, as it is known in the art.

The aircraft seat may be a helicopter seat or a seat of an airplane. The aircraft seat may be a pilot seat or a passenger seat.

In an embodiment, the coupling portion of the aircraft seat comprises a recess for accommodating the seat connection portion of the aircraft seat connector in said at least two different orientations. The recess may comprise two engagement portions. The two engagement portions may include two opposing walls or one wall and one blind hole for accommodating the fixing element.

In an embodiment, the aircraft seat is configured to be placed on the aircraft seat connector, with the recess being arranged over the seat connection portion of the aircraft seat connector.

A fixing element, such as a screw or a bolt, may extend through or into each of the two engagement portions and through one of at least two openings of the seat connection portion of the aircraft seat connector for fixing the aircraft seat to the aircraft seat connector. In particular, the fixing element may extend through one of the two opposing walls of the coupling portion, through one of said at least two openings of the seat connection portion, and through the other one of the two opposing walls of the coupling portion. Alternatively, the fixing element may extend through a wall of the coupling portion, through one of said at least two openings of the seat connection portion, and into the blind hole of the coupling portion.

The recess may be channel-shaped, slot-shaped, trough-shaped, indentation-shaped, cavity-shaped, or have another suitable shape. The recess may in particular have a u-shaped cross-section.

Exemplary embodiments of the invention further include an aircraft comprising an aircraft cabin for accommodating at least one pilot and/or at least one passenger. The aircraft may be an airplane or a helicopter.

At least one mounting rail may be provided at a floor of the aircraft cabin. At least one aircraft seat connector according to an exemplary embodiment of the invention may be employed for mounting and fixing at least one aircraft seat according to an exemplary embodiment of the invention to the at least one mounting rail.

The additional features, modifications and effects, described above with respect to aircraft seat connectors and aircraft seats according to exemplary embodiments of the invention, apply to such an aircraft in an analogous manner. This summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2A shows a schematic plan view of the aircraft cabin of an aircraft with a first configuration of mounting rails;

FIG. 2B shows a schematic plan view of the aircraft cabin of an aircraft with a second configuration of mounting rails;

DETAILED DESCRIPTION

Figure 1:
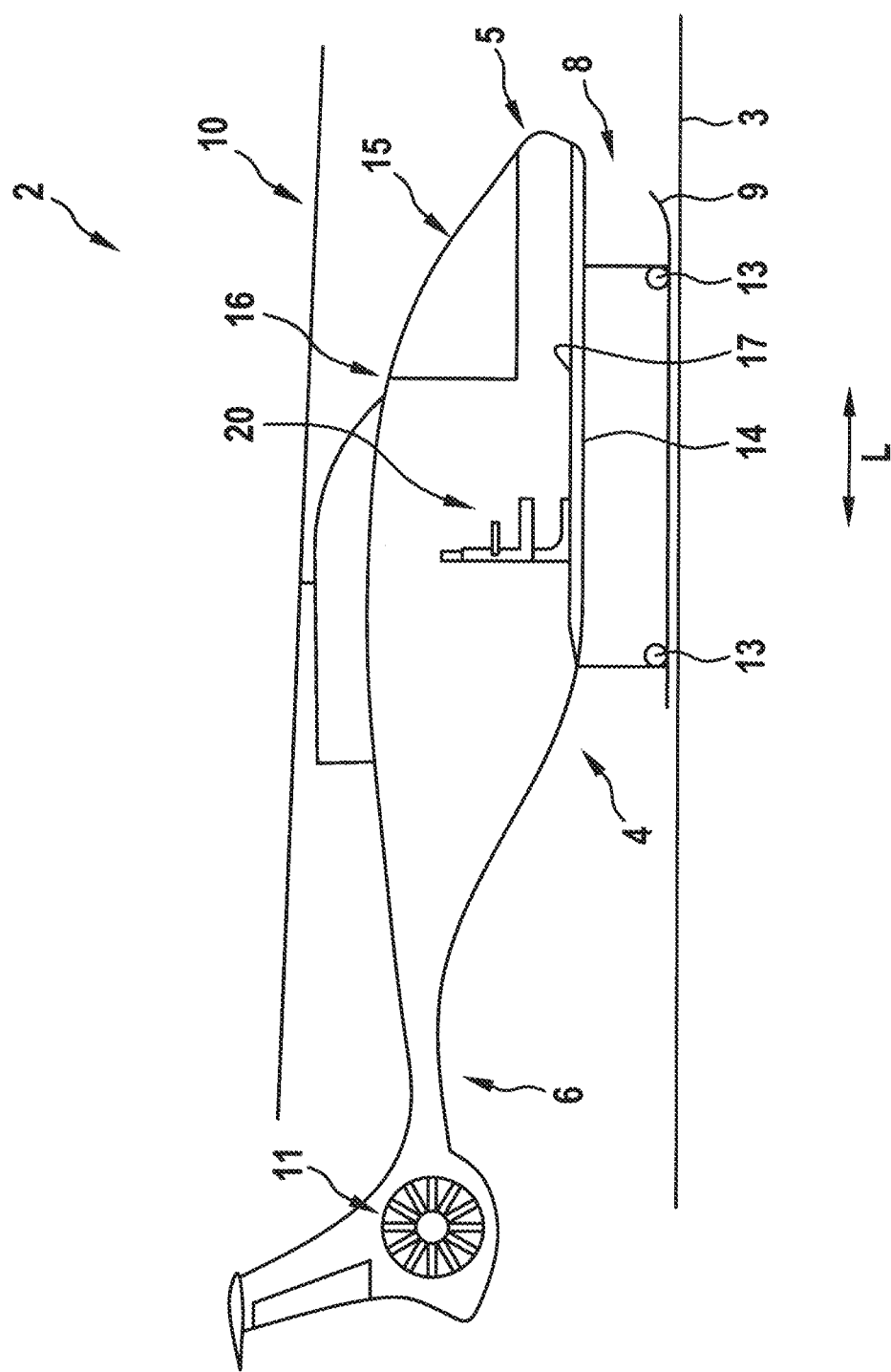
FIG. 1 shows a schematic side view of an aircraft according to an exemplary embodiment of the invention.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIG. 1 shows a schematic side view of an aircraft 2 in accordance with an exemplary embodiment of the invention. In the exemplary embodiment of FIG. 1, the aircraft 2 is a helicopter. Although the aircraft 2, as shown in FIG. 1, is a helicopter, the present invention may be similarly applied to other types of aircraft 2, in particular to airplanes.

The aircraft 2, as depicted in FIG. 1, comprises a fuselage 4 that includes a front portion 5 or nose, a rear portion 6 or tail, and an aircraft cabin 16 formed between the front portion 5 and the rear portion 6. The aircraft cabin 16 may include a cockpit 15 for accommodating the pilot(s) of the aircraft 2 and a passenger cabin located behind the cockpit 15 for accommodating passengers. The passenger cabin is optional. The aircraft 2 may be provided without a passenger cabin, in case it is not intended for transporting passengers.

An undercarriage 8, mounted to an underside of the fuselage 4, supports the aircraft 2 on a ground 3. In the embodiment depicted in FIG. 1, the undercarriage 8 comprises two skids 9, extending parallel to each other in a longitudinal direction L of the aircraft 2. In FIG. 1, the longitudinal direction L extends horizontally, parallel to the ground 3, from left to right. Only one of the skids 9 is visible in the side view depicted in FIG. 1. Alternatively or additionally to the skids 9, wheels 13 may by mounted to the undercarriage 8 for allowing the aircraft 2 to move on a solid ground 3.

The aircraft 2 comprises a main rotor 10 on top of the fuselage 4 and a tail rotor 11, provided in or at the tail 6 of the fuselage 4. In an alternative embodiment, which is not depicted on the figures, the aircraft 2 may comprises two main rotors 10, arranged in a co-extensive manner on top of the fuselage 4.

A plurality of mounting rails 17 are mounted to a floor 14 of the aircraft cabin 16. In the embodiment depicted in FIG. 1, the mounting rails 17 extend parallel to each other and parallel to the longitudinal direction L of the aircraft 2. Out of the plurality of mounting rails 17, only one mounting rail 17 is visible in the schematic side view depicted in FIG. 1.

At least one aircraft seat 20 is mounted to the plurality of mounting rails 17.

The at least one aircraft seat 20 and the plurality of mounting rails 17 may be arranged in different configurations within the aircraft cabin 16.

Two different configurations of mounting rails 17 and aircraft seats 20, which are mounted to the mounting rails 17, are exemplarily depicted in FIGS. 2A and 2B.

Each of FIGS. 2A and 2B shows a respective schematic plan view of the aircraft cabin 16 of the aircraft 2, with the rotors 10, 11 and the roof of the aircraft cabin 16 being removed, in order to allow for schematically showing the interior of the aircraft cabin 16.

In the configuration depicted in FIG. 2A, four mounting rails 17 extend parallel to each other along the longitudinal direction L of the aircraft 2. The four mounting rails 17 are arranged as two pairs 18a, 18b of mounting rails 17, including a portside pair 18a of mounting rails 17 and a starboard pair 18b of mounting rails 17. Two aircraft seats 20 are mounted to each of the two pairs 18a, 18b of mounting rails 17, respectively.

In the configuration depicted in FIG. 2B, four mounting rails 17 extend parallel to each other along a transverse direction T of the aircraft 2, which is oriented transverse, in particular substantially orthogonal, to the longitudinal direction L. The four mounting rails 17 are arranged as two pairs 18a, 18b of mounting rails 17, including a forward pair 18a of mounting rails 17 and a rearward pair 18b of mounting rails 17. Two aircraft seats 20 are mounted to each of the two pairs 18a, 18b of mounting rails 17, respectively.

In the two aircraft seat configurations depicted in FIGS. 2A and 2B, the aircraft seats 20 are oriented differently with respect to the mounting rails 17. In particular, despite the mounting rails 17 having different orientations in the configurations depicted in FIGS. 2A and 2B, the aircraft seats are orientated to face forward, i.e. to face towards the front portion/nose of the aircraft 2, in both configurations.

The aircraft seat configurations depicted in FIGS. 2A and 2B are only exemplary. An aircraft 2 according to an exemplary embodiment of the invention may comprise more or less than two pairs 18a, 18b of mounting rails 17, and more or less than two aircraft seats 20 may be mounted to each pair 18a, 18b of mounting rails 17. Also, it is possible that different numbers of aircraft seats are mounted to the respective pairs of mounting rails. It is also possible that a larger number of mounting rails is provided, in order to support the mounting of aircraft seats with different widths/different support leg spacing.

Figure 3:
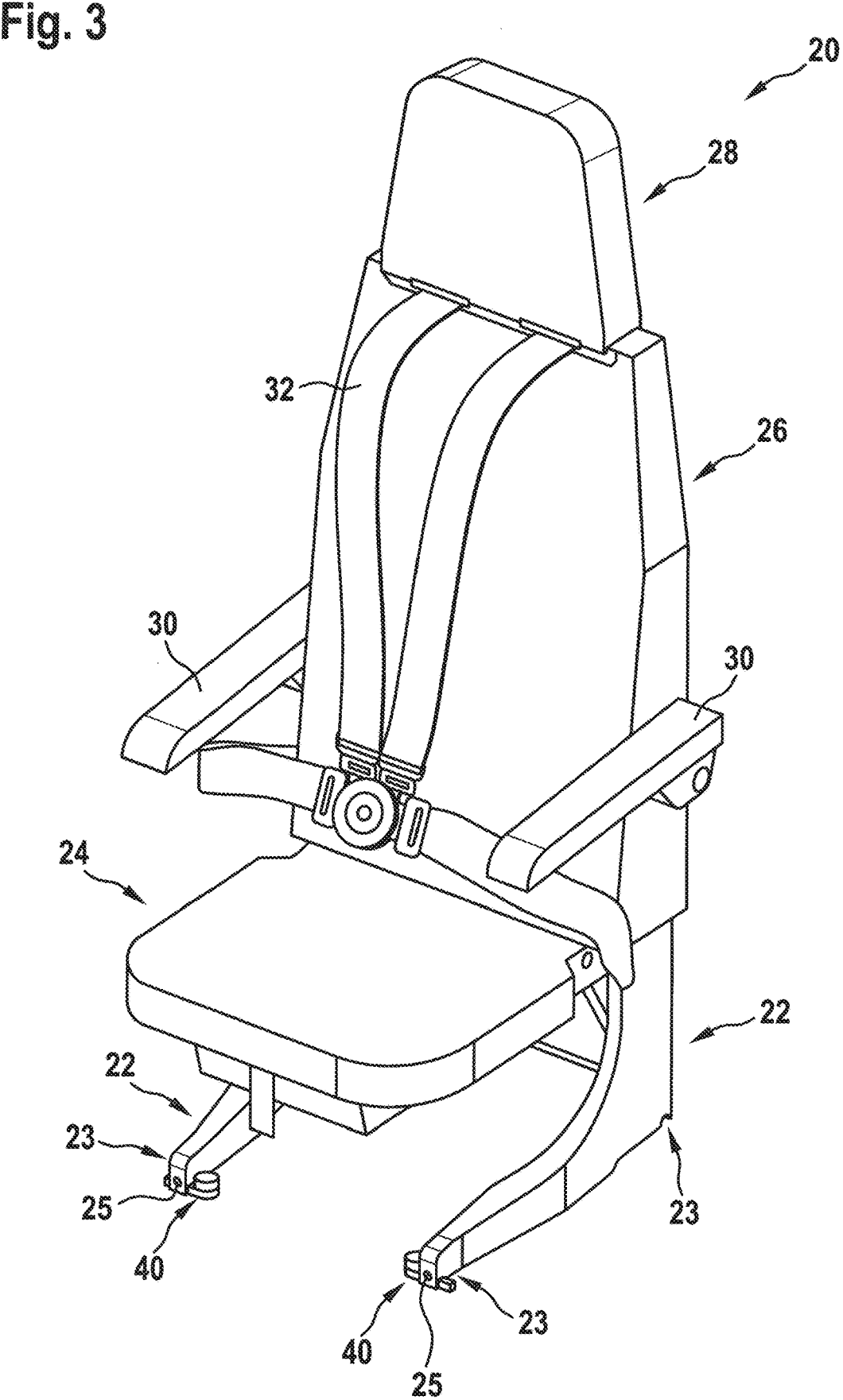
FIG. 3 shows a perspective view of an aircraft seat according to an exemplary embodiment of the invention.

FIG. 3 shows a perspective view of an aircraft seat 20 in accordance with an exemplary embodiment of the invention. The aircraft seat 20 may in particular be a helicopter seat. The aircraft seat 20 is configured for and is to be employed in an aircraft 2. The aircraft seat 20 may in particular be employed in an aircraft 2, as it is depicted in FIGS. 1, 2A, and 2B.

The aircraft seat 20 comprises two support legs 22 for supporting the aircraft seat 20 on mounting rails 17, as it is depicted in FIGS. 1, 2A, and 2B. The mounting rails 17 are not depicted in FIG. 3.

The aircraft seat 20 further comprises a seat pan 24, a backrest 26, and a headrest 28, which is provided on top of the backrest 26. The aircraft seat 20 also comprises two foldable armrests 30, which are pivotably mounted to the backrest 26, and a harness 32, which allows for strapping a person securely to the aircraft seat 20. The harness 32 may also be referred to as a seat belt system. The mentioned components may be mounted to a support frame, which is provided on the inside of the backrest 26.

Each of the support legs 22 comprises two coupling portions 23 for mounting the aircraft seat 20 to the mounting rails 17, as it is depicted in FIGS. 1, 2A, and 2B.

Each of the coupling portions 23 includes a recess, which is formed within the respective support leg 22. Every recess is shaped for engaging with an aircraft seat connector 40, which is provided for mounting the respective support leg 22 to a mounting rail 17.

A fixing element 25, such as a bolt or a screw, extends through each of the coupling portions 23 and the associated aircraft seat connector 40 for fixing the aircraft seat connector 40 to the respective support leg 22.

Each recess may be channel-shaped, slot-shaped, trough-shaped, indentation-shaped or cavity-shaped. Each recess may in particular have a u-shaped cross-section.

Each recess is in particular shaped to allow for a selective engagement with an aircraft seat connector 40 in two different orientations. Accordingly, an aircraft seat 20 can be selectively mounted in two different orientations with respect to the mounting rails 17, as it is schematically depicted in FIGS. 2A and 2B.

The coupling portions 23 may be provided with respective engagement portions, which are configured for engaging with the fixing element 25, when introducing the fixing element into the coupling portion 23 of the respective support leg 22 of the aircraft seat 20. Each engagement portion may comprise an engagement opening that interacts with the fixing element 25. The engagement opening may be formed as a through hole through a wall of the engagement portion. The engagement opening may also be a blind hole in the engagement portion. In the exemplary embodiment depicted in FIG. 3, the fixing element 25 runs through an engagement opening of a wall, located at an end of the support leg, runs through a U-shaped channel, which forms above-mentioned recess, and extends into a blind hole located in the support leg. The engagement opening in the distal wall of the support leg and the blind hole form the two engagement portions in the exemplary embodiment of FIG. 3.

Figure 4A:
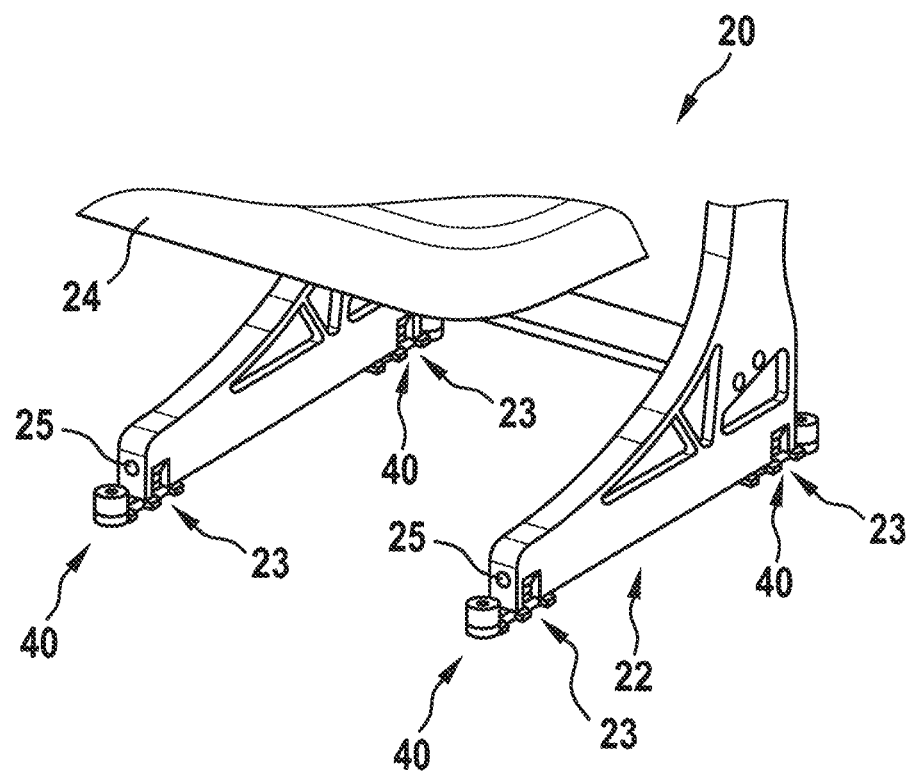
FIG. 4A shows an enlarged perspective view of the support legs of the aircraft seat of FIG. 3, when engaged with aircraft seat connectors in accordance with an exemplary embodiment of the invention, with the aircraft seat connectors being oriented in a first orientation.

FIG. 4A shows an enlarged perspective view of the support legs 22 of the aircraft seat 20 of FIG. 3, with four aircraft seat connectors 40 according to an exemplary embodiment of the invention being engaged with the coupling portions 23 of the support legs 22 in a first orientation, which may be called a longitudinal configuration. In the longitudinal configuration, the aircraft seat 20 is mounted to the mounting rails 17, provided in the aircraft cabin 16 of the aircraft 2, in an orientation as it is schematically depicted in FIGS. 1 and 2A. In particular, the support legs 22 of the aircraft seat 20 are substantially aligned with the mounting rails 17 in the longitudinal configuration.

Figure 4B:
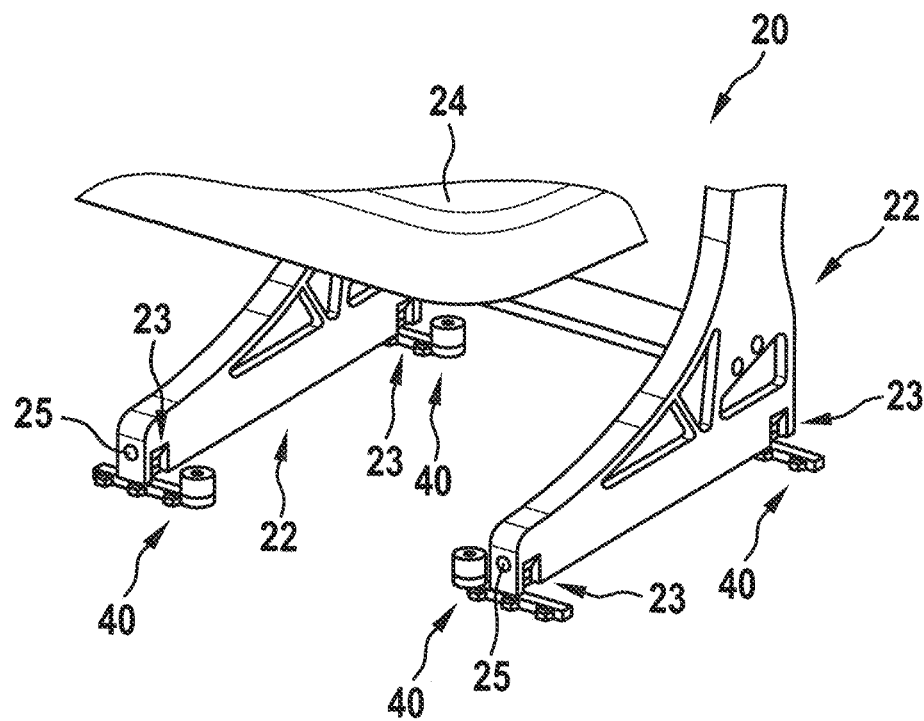
FIG. 4B shows an enlarged perspective view of the support legs of the aircraft seat of FIG. 3, when engaged with aircraft seat connectors in accordance with an exemplary embodiment of the invention, with the aircraft seat connectors being oriented in a second orientation.

FIG. 4B shows an enlarged perspective view of the support legs 22 of the aircraft seat 20 of FIG. 3, with four aircraft seat connectors 40 according to an exemplary embodiment of the invention being engaged with the coupling portions 23 of the support legs 22 in a second orientation, which may be called a transverse configuration. In the transverse configuration, the four aircraft seat connectors 40 are rotated by 90° around a vertical axis, when compared to the longitudinal configuration. In the transverse configuration, the aircraft seat 20 is mounted to the mounting rails 17, provided in the aircraft cabin 16 of the aircraft 2, in an orientation as it is schematically depicted in FIG. 2B. In particular, the support legs 22 of the aircraft seat extend substantially orthogonal to the mounting rails 17 in the transverse configuration.

Figure 5:
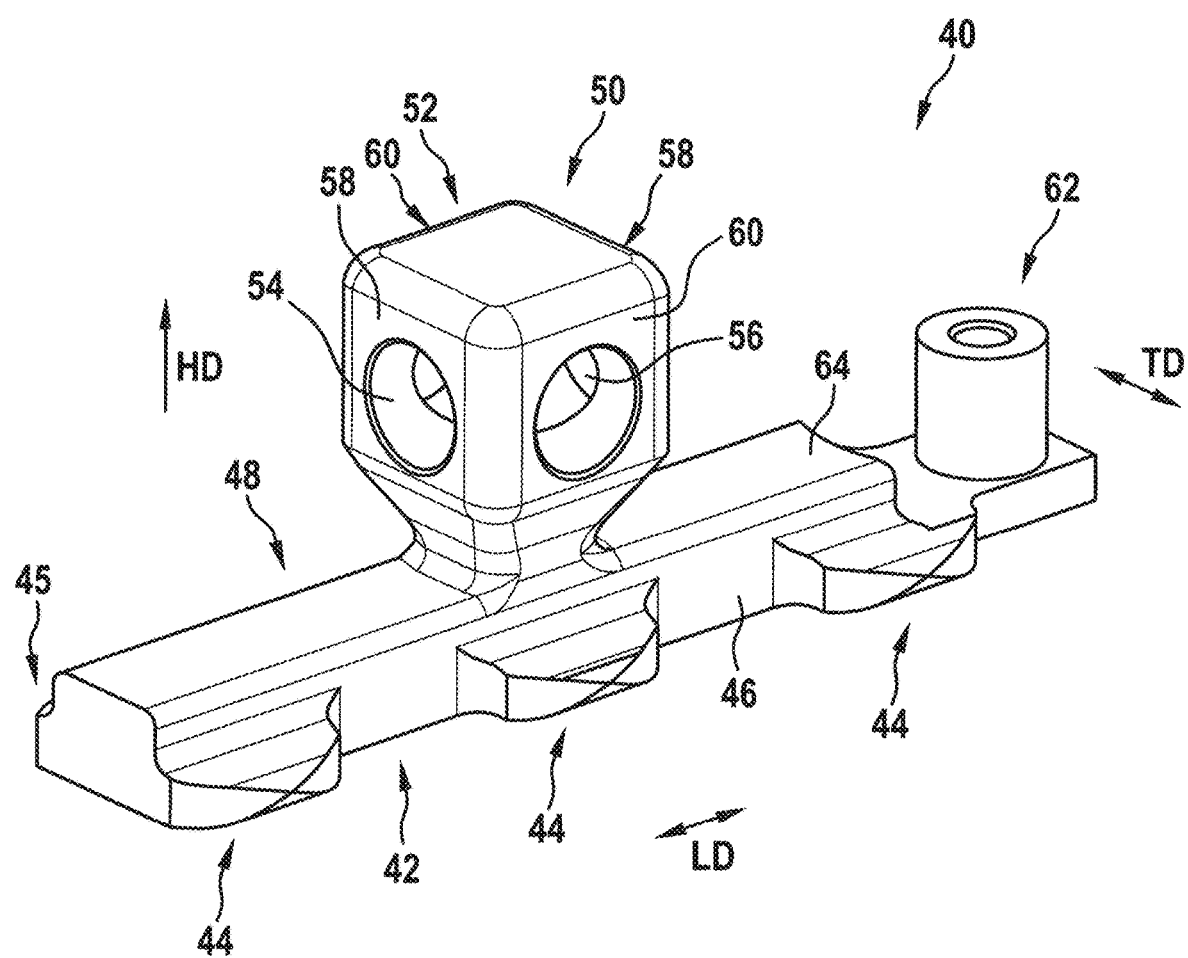
FIG. 5 shows a perspective view of an aircraft seat connector according to an exemplary embodiment of the invention.

FIG. 5 shows a perspective view of an aircraft seat connector 40 according to an exemplary embodiment of the invention. The aircraft seat connector 40 of FIG. 5 may be used in the setups depicted in FIGS. 3, 4A, and 4B.

The aircraft seat connector 40 comprises a base portion 42 for being introduced into one of the mounting rails 17. The base portion 42 extends in a longitudinal direction LD of the aircraft seat connector 40.

When the aircraft seat connector 40 is mounted to a mounting rail 17, the longitudinal direction LD of the aircraft seat connector 40 extends along the longitudinal extension of said mounting rail 17.

In case the mounting rails 17 within the aircraft cabin 16 are oriented along the longitudinal direction L of the aircraft 2, the longitudinal direction LD of the aircraft seat connector 40 extends along the longitudinal direction L of the aircraft 2, when the aircraft seat connector 40 is mounted to the mounting rails 17, as it is depicted in FIG. 2A.

In case the mounting rails 17 within the aircraft cabin 16 are oriented along the transverse direction T of the aircraft 2, the longitudinal direction LD of the aircraft seat connector 40 extends along the transverse direction T of the aircraft 2, when the aircraft seat connector 40 is mounted to the mounting rails 17, as it is depicted in FIG. 2B.

The longitudinal direction LD of the aircraft seat connector 40 may extend along a different direction, for example along a diagonal direction, if the mounting rails 17 are oriented along such a different direction within the aircraft 2.

The base portion 42 may have a longitudinal extension or length in the range of between 20 mm and 390 mm in the longitudinal direction LD, and the base portion 42 may have a transverse extension or width in the range of between 20 mm and 130 mm in the transverse direction TD.

The base portion 42 may have a height in the range of between 5 mm and 80 mm.

A plurality of wing-shaped protrusions 44, 45 protrude laterally, i.e. transverse to the longitudinal direction LD, form the base portion 42 of the aircraft seat connector 40. The wing-shaped protrusions 44, 45 may in particular protrude orthogonal to longitudinal direction LD from the base portion 42. The wing-shaped protrusions 44, 45 may be configured for sliding into corresponding undercuts, formed in the mounting rail 17, for securing the base portion 42 within the mounting rail 17.

In the embodiment depicted the FIG. 5, three pairs of wing-shaped protrusions 44, 45 protrude laterally form the base portion 42. One protrusion 44 of each pair of protrusions 44, 45 protrudes from a first side 46 of the base portion 42, and one protrusion 45 of each pair of protrusions 44, 45 protrudes from a second side 48 of the base portion 42. Only a small portion of one of the protrusions 45, protruding from the second side 48 of the base portion 42, is visible in FIG. 5. The pairs of wing-shaped protrusions 44, 45 are symmetrical with respect to a longitudinal center axis of the base portion 42.

Each of the protrusions 44, 45 may have a longitudinal extension or length in the range of between 5 mm and 80 mm in the longitudinal direction LD. Each of the protrusions 44, 45 may protrude by an extension in the range of between 5 mm and 80 mm from the first side 46 or from the second side 48 of the base portion 42 in the transverse direction TD.

The aircraft seat connector 40 further comprises a seat connection portion 50. The seat connection portion 50 extends from the base portion 42 in a height direction HD, which is oriented orthogonal to a plane spanned by the longitudinal direction LD and by the transverse direction TD of the aircraft seat connector 40.

The seat connection portion 50 is configured for being releasably coupled to one of the coupling portions 23, provided at the support legs 22 of the aircraft seat 20, as described above with respect to FIGS. 3, 4A, and 4B. The seat connection portion 50 may in particular be configured for being introduced into a recess, which is formed as part of the coupling portion 23 within the respective support leg 22.

In the embodiment depicted in FIG. 5, the seat connection portion 50 includes a cubic head portion 52. The cubic head portion 52 allows for coupling the aircraft seat 20 to the seat connection portion 50 in two different spatial orientations, which are rotated by 90° with respect to each other.

Two openings 54, 56 are formed within the cubic head portion 52. Each opening 54, 56 is configured for receiving a fixing element 25, for example a bolt or a screw, which is not shown in FIG. 5. The fixing element 25 may extend through the respective opening 54, 56 for fixing the coupling portion 23 of an aircraft seat 20 to the aircraft seat connector 40.

The two openings 54, 56 extend through the cubic head portion 52 of the seat connection portion 50 in two different directions, which are in particular orthogonal/perpendicular to each other. This allows for mounting the aircraft seat 20 to the aircraft seat connector 40 in two different orientations, as depicted in FIGS. 4A and 4B, by passing the fixing element 25 selectively through one of the two openings 54, 56.

In the embodiment depicted in FIG. 5, the two openings 54, 56 comprise a first opening 54, which extends in the longitudinal direction LD of the aircraft seat connector 40, and a second opening 56, which extends in the transverse direction TD of the aircraft seat connector 40. The transverse direction TD of the aircraft seat connector 40 is oriented substantially orthogonal to the longitudinal direction LD of the aircraft seat connector 40.

In this context, the expression substantially orthogonal is to be understood as describing the transverse direction TD to be oriented exactly orthogonal or very close to orthogonal with respect to the longitudinal direction LD of the aircraft seat connector 40. The expression substantially orthogonal may in particular include all orientations that deviate by less than 5° from an exactly orthogonal orientation.

In the embodiment depicted in FIG. 5, the two openings 54, 56 extend in a common connection plane, which is a virtual plane encompassing the center axes of the two openings 54, 56, and the base portion 42 of the aircraft seat connector 40 extends substantially parallel to said common connection plane. The two openings 54, 56 cross within the cubic head portion 52. The two openings 54, 56 are two channels that run through the cubic head portion 52.

The cubic head portion 52 includes a first pair of side walls 58, extending in the transverse direction TD and being arranged on opposite sides of the cubic head portion 52 along the longitudinal direction LD. In the perspective view of the cubic head portion 52 depicted in FIG. 5, only one of the two side walls 58 of the first pair of side walls 58 is visible, as the view to the second side wall 58 is blocked by the cubic head portion 52. The first opening 54 runs through said first pair of side walls 58 and allows for the fixing element 25 to pass through the first pair of side walls 58 in the longitudinal direction LD.

The cubic head portion 52 further includes a second pair of side walls 60, extending in the lateral direction LD and being arranged on opposite sides of the cubic head portion 52 along the transverse direction TD. In the perspective view of the cubic head portion 52 depicted in FIG. 5, only one of the two side walls 60 of the second pair of side walls 60 is visible, as the view to the second side wall 60 is blocked by the cubic head portion 52. The second opening 56 runs through said second pair of side walls 60 and allows for the fixing element 25 to pass through the second pair of side walls 60 in the transverse direction TD.

In the embodiment depicted in FIG. 5, the head portion 52 is hollow, i.e. the space between the opposing sidewalls 58, 60 is empty, reducing the material used for forming the head portion 52. This allows for reducing the weight of the cubic head portion 52. It is also possible that the empty space of the first and second openings 54, 56 corresponds to the combination of two cylindrical channels, running through the cubic head portion 52.

In further embodiments, which are not explicitly shown in the figures, the head portion 52 may have different geometric shapes than the cubic shape of the head portion 52 depicted in FIG. 5.

The head portion 52 may, for example, have the shape of a polyhedron with multiple side walls, which are not oriented orthogonal to each other. Openings may be formed in each of said sidewalls in order to allow for selectively coupling the aircraft seat 20 to the seat connection portion 50 of the aircraft seat connector 40 in more than two different orientations.

When measured from a top surface 64 of the base portion 42, the seat connection portion 50 may have a height in the range of between 5 mm and 130 mm.

The seat connection portion 50 may have a longitudinal extension in the range of between 5 mm and 130 mm in the longitudinal direction LD. The seat connection portion 50 may have a transverse extension in the range of between 5 mm and 130 mm in the transverse direction TD.

The aircraft seat connector 40 further comprises a fixing mechanism 62, which is provided at the base portion 42 and which is configured for fixing the aircraft seat connector 40 to the mounting rail 17. The fixing mechanism 62 may in particular be a spring driven fast fixing mechanism 62, which allows for securely fixing the base portion 42 to the mounting rail 17, employing the elastic force provided by a spring, and which further allows for releasing the base portion 42 from the mounting rail 17 in a fast and convenient manner, for example by lifting a portion of the fast fixing mechanism 62 in the height direction HD.

Employing such spring driven fast fixing mechanism 62 may allow for changing the seat configuration in the aircraft cabin 16 and/or replacing at least some of the aircraft seats 20 in a fast and convenient manner.

Mounting an aircraft seat 20 to mounting rails 17, which are provided at a floor of an aircraft cabin 16 of an aircraft 2, such as an airplane or a helicopter, may include introducing the base portion 42 of multiple aircraft seat connectors 40, in particular of four aircraft seat connectors 40, into one or more mounting rails 17 for mounting the aircraft seat connectors 40 to the one or more mounting rails 17.

Mounting the aircraft seat 20 to the mounting rails 17 may further include mounting the coupling portions 23 of the aircraft seat 20 to the seat connection portions 50 of the aircraft seat connectors 40 in one of at least two different orientations that are possible between the coupling portions 23 of the aircraft seat 20 and the seat connection portions 50 of the aircraft seat connectors 40.

Mounting the coupling portions 23 of the aircraft seat 20 to the seat connection portions 50 of the aircraft seat connectors 40 may in particular include placing the aircraft seat 20 on the aircraft seat connectors 40, with each of the recesses of the coupling portions 23 being arranged over the seat connection portion 50 of a respective aircraft seat connector 40, as it is depicted in FIGS. 4A and 4B, and then passing fixing elements 25 into each of the coupling portions 23 and through one of the openings 54, 56, formed within the seat connection portions 50 of each of the aircraft seat connectors 40, for securely fixing the aircraft seat 20 to the aircraft seat connector 40.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft seat connector, the aircraft seat connector comprising:
    a base portion for being introduced into a mounting rail, the mounting rail provided at a floor of an aircraft cabin; and
    a seat connection portion, extending from the base portion and configured for being releasably coupled to an aircraft seat,
    wherein the seat connection portion comprises at least two openings;
    wherein each of the at least two openings is configured for receiving a fixing element to fix the aircraft seat to the aircraft seat connector,
    wherein the at least two openings extend through the seat connection portion in at least two different directions, allowing for the aircraft seat to be mounted to the aircraft seat connector in at least two different orientations by passing the fixing element selectively through one of the at least two openings; and
    wherein the seat connection portion allows for coupling the aircraft seat to the seat connection portion in at least two different spatial orientations.

2. The aircraft seat connector according to claim 1, wherein:
    the at least two openings are exactly two openings;
    wherein the exactly two openings extend substantially orthogonal to each other; and
    wherein the exactly two openings comprise a first opening extending in a longitudinal direction of the aircraft seat connector and a second opening extending in a transverse direction of the aircraft seat connector.

3. The aircraft seat connector according to claim 2, wherein the seat connection portion comprises:
    a first pair of walls extending in the transverse direction T and being arranged on opposite sides of the seat connection portion along the longitudinal direction, with the first opening running through the first pair of walls and allowing for the fixing element to pass through the first pair of walls in the longitudinal direction; and
    a second pair of walls extending in the longitudinal direction and being arranged on opposite sides of the seat connection portion along the transverse direction, with the second opening running through the second pair of walls and allowing for the fixing element to pass through the second pair of walls in the transverse direction.

4. The aircraft seat connector according to claim 1, wherein:
    the at least two openings extend in a common connection plane; and
    wherein the base portion is oriented parallel to said common connection plane.

5. The aircraft seat connector according to claim 1, wherein:
    the seat connection portion includes a cubic head portion; and
    wherein the at least two openings extend through the cubic head portion.

6. The aircraft seat connector according to claim 1, wherein the seat connection portion is integrally formed with the base portion.

7. The aircraft seat connector of claim 1, wherein the seat connection portion extends from the base portion in a height direction (HD).

8. The aircraft seat connector according to claim 1, wherein the base portion has at least one of:
    a longitudinal extension in the range of between 20 mm and 390 mm;
    a transverse extension in the range of between 20 mm and 130 mm; or
    a longitudinal extension in the range of between 5 mm and 130 mm.

9. The aircraft seat connector according to claim 1, wherein the seat connection portion has at least one of:
    a transverse extension in the range of between 5 mm and 130 mm; or
    a height extension in the range of between 5 mm and 130 mm.

10. The aircraft seat connector according to claim 1, further comprising:
    a spring-driven fixing mechanism for fixing the base portion to the mounting rail.

11. The aircraft seat connector according to claim 1, wherein the base portion comprises at least one pair of wing-shaped protrusions protruding laterally form the base portion and being configured to slide into corresponding undercuts of the mounting rail.

12. The aircraft seat connector according to claim 1, wherein the aircraft seat connector is a helicopter seat connector for mounting a helicopter seat to the mounting rail provided at the floor of a helicopter cabin.

13. An aircraft seat, comprising:
    an aircraft seat connector, the aircraft seat connector comprising:
        a base portion for being introduced into a mounting rail, the mounting rail provided at a floor of an aircraft cabin; and
        a seat connection portion extending from the base portion and configured for being releasably coupled to the aircraft seat,
        wherein the seat connection portion comprises at least two openings;

wherein each of the at least two openings is configured for receiving a fixing element to fix the aircraft seat to the aircraft seat connector, wherein the at least two openings extend through the seat connection portion in at least two different directions, allowing for the aircraft seat to be mounted to the aircraft seat connector in at least two different orientations by passing the fixing element selectively through one of the at least two openings; and wherein the seat connection portion allows for coupling the aircraft seat to the seat connection portion in at least two different spatial orientations; and a coupling portion configured for coupling the aircraft seat to the seat connection portion of the aircraft seat connector; and wherein the coupling portion is shaped to selectively engage with the seat connection portion of the aircraft seat connector in at least two different orientations of the aircraft seat with respect to the aircraft seat connector.

14. The aircraft seat according to claim 13, wherein the coupling portion comprises:

a recess for accommodating the seat connection portion of the aircraft seat connector in said at least two different orientations, wherein the recess comprises two engagement portions; and wherein the aircraft seat is configured to be placed on the aircraft seat connector, with the recess being arranged over the seat connection portion of the aircraft seat connector, and wherein a fixing element extends through or into each of the two engagement portions and through one of at least two openings of the seat connection portion of the aircraft seat connector for fixing the aircraft seat to the aircraft seat connector.

15. The aircraft seat according to claim 14, wherein the fixing element includes at least one of a screw or a bolt.

16. A method of mounting an aircraft seat, the method comprising:

introducing a base portion of an aircraft seat connector into a mounting rail for mounting the aircraft seat connector to the mounting rail, the mounting rail provided at a floor of an aircraft cabin of an aircraft, wherein the aircraft seat connector further comprises a seat connection portion extending from the base portion and configured for being releasably coupled to an aircraft seat;

wherein the seat connection portion comprises at least two openings, wherein each of the at least two openings is configured for receiving a fixing element to fix the aircraft seat to the aircraft seat connector, wherein the at least two openings extend through the seat connection portion in at least two different directions, and wherein the seat connection portion allows for coupling the aircraft seat to the seat connection portion in at least two different spatial orientations; and mounting a coupling portion of the aircraft seat to the seat connection portion of the aircraft seat connector in one of at least two different orientations that are possible between the coupling portion of the aircraft seat and the seat connection portion of the aircraft seat connector.

17. The method according to claim 16, wherein mounting the coupling portion of the aircraft seat to the seat connection portion of the aircraft seat connector includes:

passing the fixing element through one of the at least two openings formed in the seat connection portion of the aircraft seat connector.

* * * * *